UNITED STATES PATENT OFFICE.

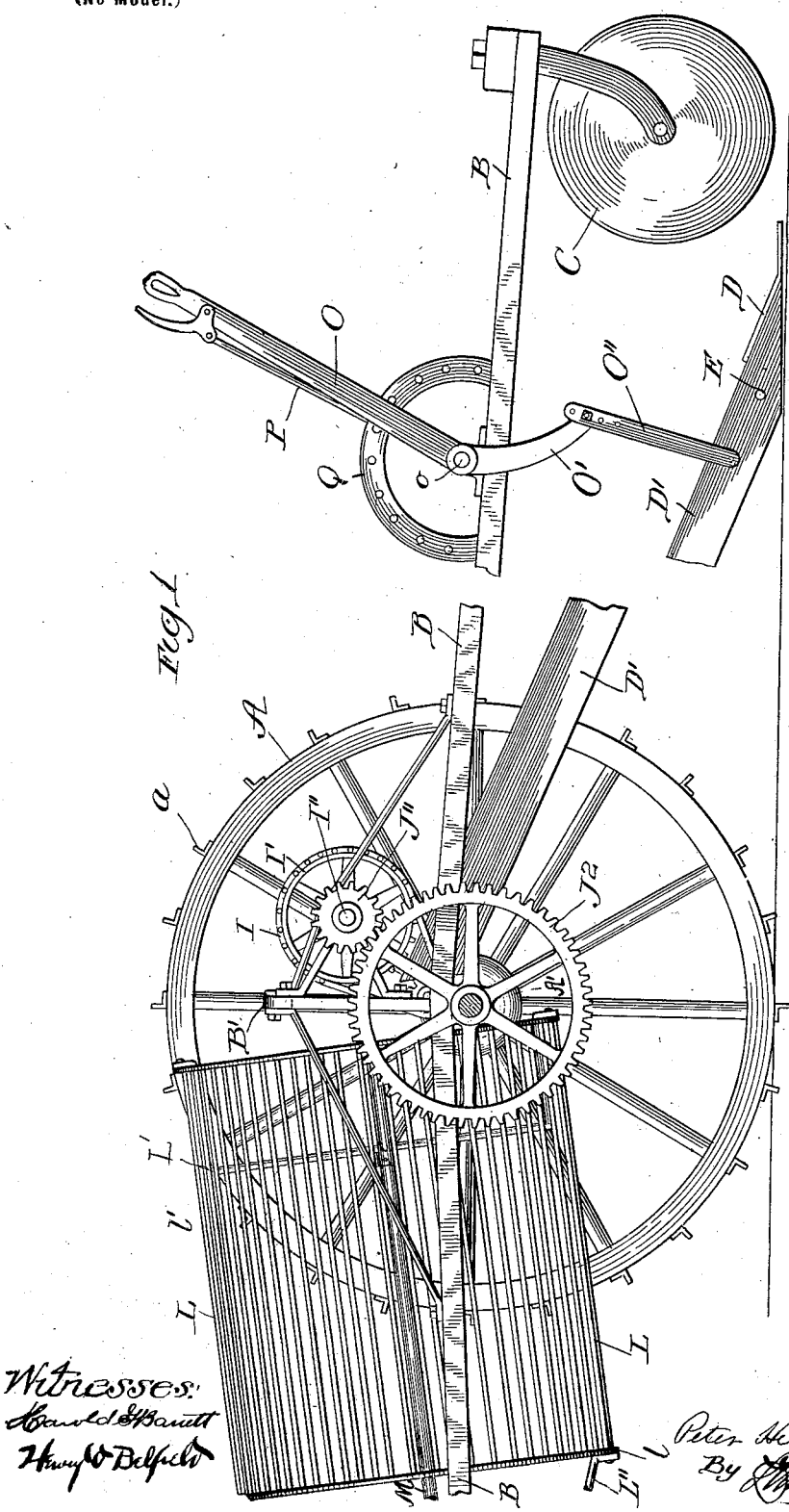

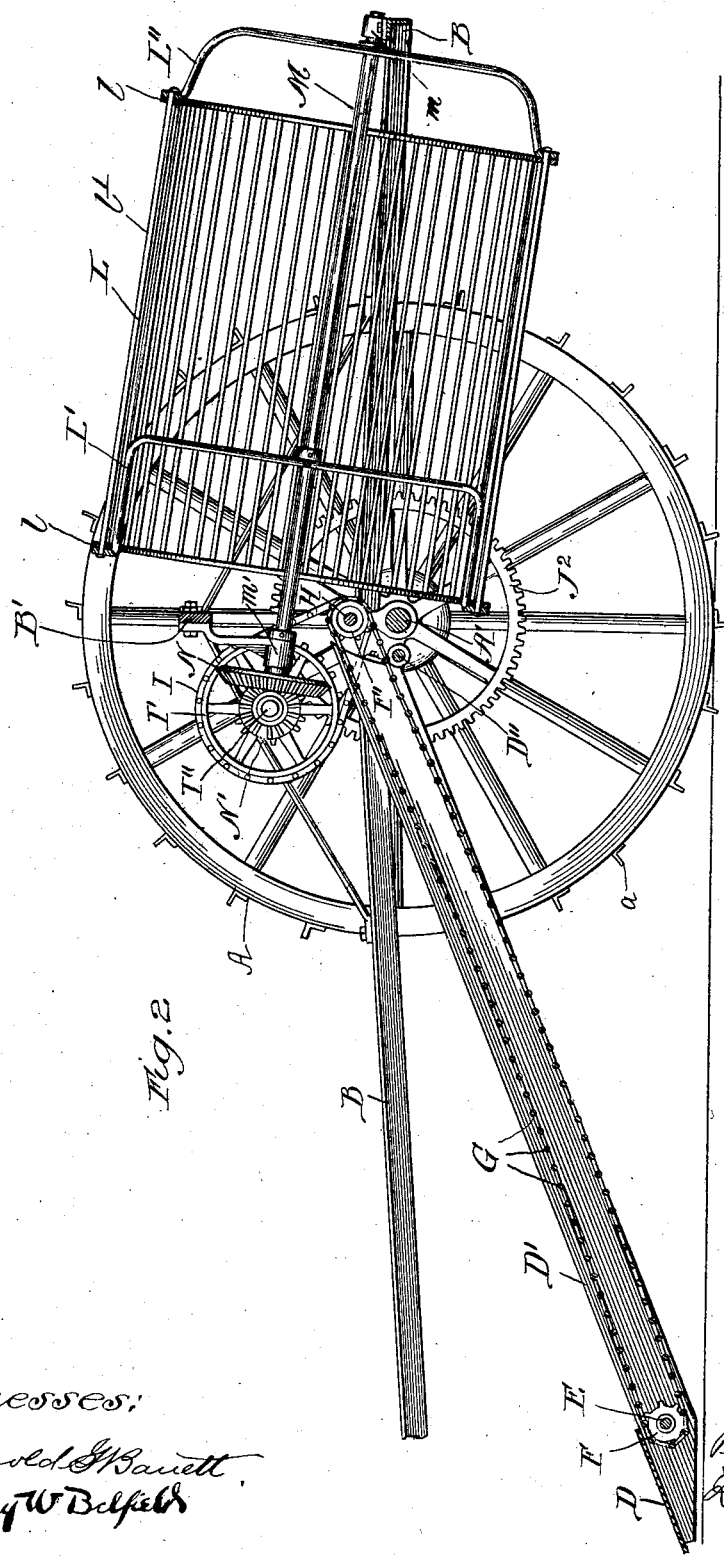

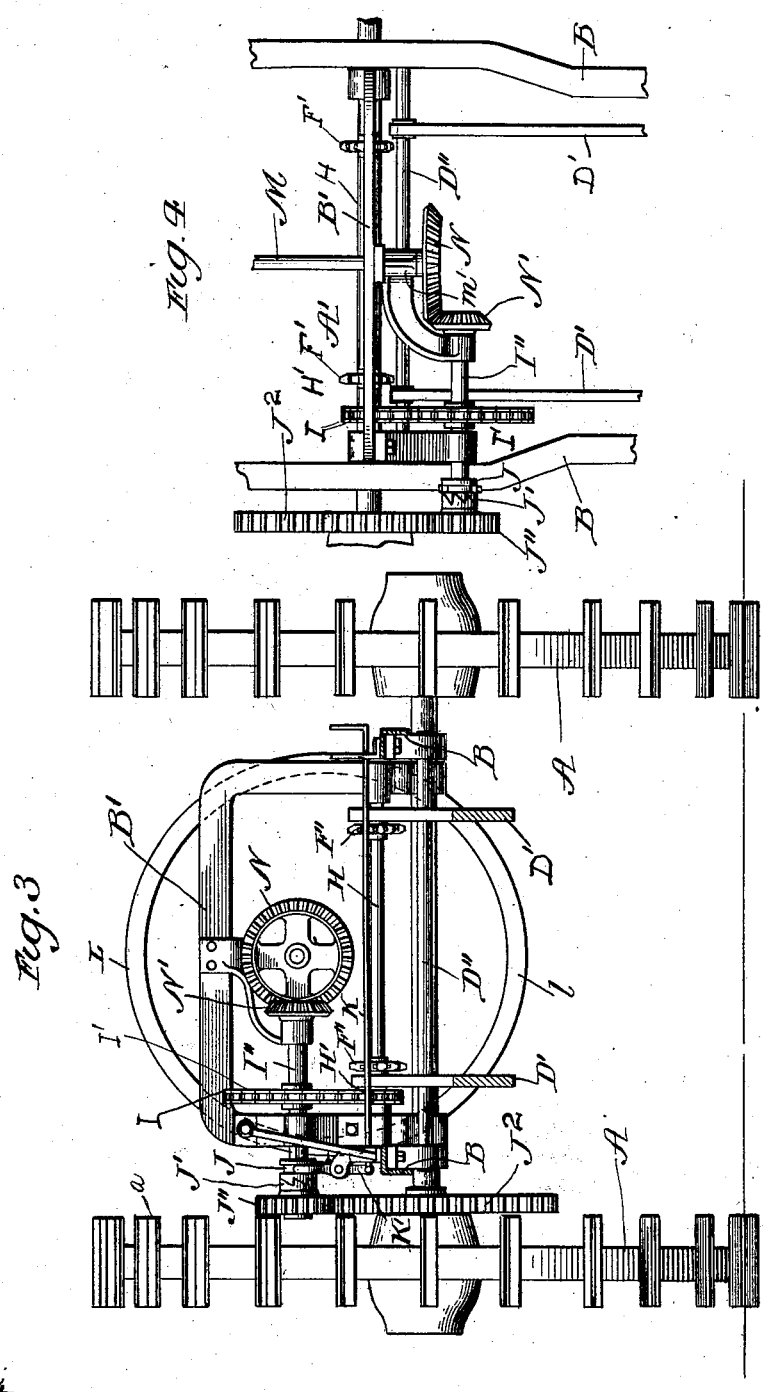

PETER HESSELIUS, OF CHICAGO, ILLINOIS.

POTATO-DIGGER.

SPECIFICATION forming part of Letters Patent No. 703,727, dated July 1, 1902.

Application filed May 23, 1901. Serial No. 61,547. (No model.)

*To all whom it may concern:*

Be it known that I, PETER HESSELIUS, a citizen of the United States, residing at Chicago, in the county of Cook and State of Illinois, have invented certain new and useful Improvements in Potato-Diggers, of which the following is a specification.

The object of the present invention is to provide a machine adapted to be drawn by horse-power, that will not only dig the potatoes out of the ground, but will thoroughly remove the earth from them and either deliver them into a receptacle carried by the machine or drop them onto the ground at the rear of the machine. To this end the machine comprises a suitable frame supported by ground-wheels, a plow, an endless conveyer located behind the plow and adapted to carry the potatoes upward and rearward, and a revoluble cleaning-sieve into which the potatoes are delivered by the conveyer, suitable means being provided for driving both the conveyer and the cleaning-drum by power derived from the ground-wheels.

The invention consists in the features of novelty, that are hereinafter fully described.

In the accompanying drawings, which are made a part hereof, Figure 1 is a side elevation of a potato-digger embodying the invention, the near ground-wheel being omitted and certain intermediate portions broken away. Fig. 2 is a similar view taken from the opposite side of the machine. Fig. 3 is a front elevation of the machine with some parts omitted. Fig. 4 is a plan view of some of the parts.

A represents the ground-wheels, which are preferably of narrow tread; but in order to prevent them from sinking too far into the ground and at the same time give them the necessary traction they are provided on their peripheries with wings $a$, each made of a piece of angle-iron arranged parallel with the axle and of sufficient length to project at both ends beyond the plane of the wheel.

B represents a horizontal frame, also made of angle-iron and supported by the axle A' of the ground-wheels. The forward end of this frame is provided with a caster-wheel C, by which it is supported.

D is the plow or shovel, which is secured to the forward end of a pair of beams D', the rear ends of which are pivoted to a rod D'', which is supported by the frame B and extends from side to side thereof. Near the lower ends of the beams D' and preferably beneath the plow is a shaft E, carrying sprocket-wheels F, over which runs an endless conveyer G, disposed between the beams D'. At its rear end this conveyer runs over sprocket-wheels F', secured to a shaft H, journaled in suitable bearings in the frame, said shaft being provided with a third sprocket-wheel H', over which runs a sprocket-chain I, by which the shaft H is driven. The sprocket-chain passes also over a sprocket-wheel I', carried by a shaft I'', upon which one member J of a clutch is mounted so as to be capable of sliding endwise, but incapable of rotating relatively thereto. The other member J' of this clutch is carried by a pinion J'', meshing with a larger pinion $J^2$, carried by one of the ground-wheels. By this means the pinion $J^2$ will impart rotation to the pinion J'', and when the clutch members are in engagement this will impart movement to the shaft I'', from which it is transmitted through the sprocket-wheel I', sprocket-chain I, and sprocket-wheel H' to the shaft H, whereby the endless conveyer G is driven. The relative diameters of the several pinions are such that the surface speed of the conveyer will be somewhat greater than the speed at which the machine is drawn forward, so that an accumulation upon the plow or the lower end of the conveyer is avoided.

For the purpose of actuating the sliding clutch member J it is provided with a groove into which projects the forked end of a lever K', the other end of which is connected to a hand-rod K, which crosses the machine from side to side and is guided by any suitable means.

Upon reaching the upper end of the conveyer the potatoes are discharged into a revoluble sieve L, which is preferably made up of a pair of end rings $l$, a number of parallel rods $l'$, placed at the proper distance apart, and a pair of spiders L' L'', which are secured to the rings and are directly supported by a shaft M, which is central with respect to the drum and is journaled at its rear end in a bearing $m$, carried by the frame B, and at its forward end in a bearing $m'$, carried by a bracket-arm proceeding downward from a vertical portion B' of the frame. For the purpose of imparting rotation to the sieve the forward end of the shaft M is provided with a beveled gear-wheel N, meshing with a correspondingly-beveled gear-wheel N', carried by the shaft I''. By properly proportioning the gear-wheels N N' the sieve may be driven at the desired speed. Its effect is to tumble the potatoes and in this way remove the earth from them. The sieve slopes downward toward its rear end, so that the potatoes will gradually move toward its rear end, where they are discharged either onto the ground or into a receptacle which may be suspended from the rear portion of the frame.

For the purpose of preventing the spider L' from obstructing the receiving end of the sieve it is provided with offset portions which bring its radial portions within the sieve and a considerable distance from its receiving end, and for the purpose of preventing the spider L'' from interfering with the discharge of the potatoes it is provided with offset portions which bring its radial portions outside of the sieve and a considerable distance from its end.

For the purpose of supporting the forward ends of the beams D' and holding the plow in position to enter the ground to the necessary depth and for the further purpose of lifting the plow out of the ground and holding it elevated when traveling from place to place I use a lever O, secured to a rock-shaft o, journaled in suitable bearings carried by the frame and crossing it from side to side. This rock-shaft carries at its ends arms O', connected by links O'' with the beams D'. The lever is provided with a latch-lever P, adapted to engage any one of a series of perforations in an arc Q, carried by the frame B.

It will be observed that the endless conveyer and the beams for carrying the plow are independently supported, that they move about different centers as they rise and fall, and that the support for the beams is outside of the two laps of the conveyer.

One of the advantages in placing the support for the beams entirely outside of the two laps of the conveyer is that either may be shipped or detached without disturbing the other. An advantage in supporting the beams independently of the conveyer-shaft is that the latter is not subjected to the severe strains that would come upon it if the beams were mounted upon it. An advantage in supporting the beams and conveyer independently of each other and from different centers is that the rising and falling of the forward ends of the beams during the operation of the device will alternately slacken and tighten the conveyer, and thus more or less agitate the potatoes and earth resting upon it, with the result that the earth will be broken away from the potatoes and allowed to drop through the conveyer. Another advantage of this arrangement of the centers is that by elevating the forward ends of the beams the conveyer may be slackened sufficiently to enable the sprocket-chains to be shipped from the sprocket-wheels without disturbing either of the supporting-shafts of the conveyer, and this will very materially facilitate the manipulation of the parts for repairing or cleaning them.

Having described my invention, what I claim as new therein, and desire to secure by Letters Patent, is—

1. In a potato-digger, the combination of the ground-wheels, the axle thereof, a frame supported by the axle, a rod parallel with the axle and supported by the frame, beams pivotally supported by said rod, a plow carried by the forward ends of the beams, a shaft carried by the forward ends of the beams, sprocket-wheels carried by the shaft, an endless conveyer embracing the sprocket-wheel, a second shaft supported by the frame of the machine independently of the beams, sprocket-wheels carried by said shaft and embraced by the conveyer, and gearing between said second shaft and the ground-wheels, substantially as described.

2. In a potato-digger, the combination of the ground-wheels, the axle thereof, a frame supported by the axle, a shaft journaled in bearings and supported by the frame, gearing connecting said shaft with the ground-wheels, sprocket-wheels carried by said shaft, an endless conveyer passing over said sprocket-wheels, beams pivotally supported independently of said shaft, a plow carried by the beams, and sprocket-wheels carried by said beams in the vicinity of the plow over which the endless conveyer passes, substantially as described.

3. In a potato-digger, the combination of the ground-wheels, the axle thereof, a frame supported by the axle, beams pivotally supported at their rear ends by the frame, a plow carried by the forward ends of the beams, sprocket-wheels supported by the forward ends of the beams, an endless conveyer passing over said sprocket-wheels, means for supporting and driving the rear end of said conveyer, said supporting means being independent of the beams, a rock-shaft supported by the frame, and means for raising and lowering the forward ends of the beams, substantially as described.

PETER HESSELIUS.

Witnesses:
L. M. HOPKINS,
BERTHA C. SIMS.